United States Patent [19]

Kumada et al.

[11] Patent Number: 5,097,248

[45] Date of Patent: Mar. 17, 1992

[54] ELECTRODE FOR LEVEL DETECTION

[75] Inventors: Akira Kumada; Kenji Matsuo, both of Kanagawa; Michihiro Murata, Kyoto, all of Japan

[73] Assignee: Murata Mfg. Co., Ltd., Kyoto, Japan

[21] Appl. No.: 472,700

[22] Filed: Jan. 31, 1990

[30] Foreign Application Priority Data

Feb. 10, 1989 [JP] Japan .................. 1-15162[U]
Feb. 10, 1989 [JP] Japan .................. 1-15163[U]

[51] Int. Cl.$^5$ .................. H01C 10/02; G01F 23/00
[52] U.S. Cl. .................. 338/80; 338/82; 338/84; 338/86; 338/94; 338/151; 73/290 R; 73/304 R
[58] Field of Search .................. 338/34, 38, 44, 27, 338/222, 231, 80-88, 94, 151; 73/290 R, 304 R, 308, 313, 750

[56] References Cited

U.S. PATENT DOCUMENTS 4,461,175  7/1984  Baumgart et al. .................. 73/304 R

FOREIGN PATENT DOCUMENTS 2246557  3/1974  Fed. Rep. of Germany .

Primary Examiner—Marvin M. Lateef
Attorney, Agent, or Firm—Jordan and Hamburg

[57] ABSTRACT

An electrode for level detection includes a detection electrode including conductor portions and resistor portions arranged and formed one after the other in a level change direction. An insulating coating layer is formed on either each conductor portion or each resistor portion. The insulating coating layer may be of a film having a property to repel a liquid to be measured.

6 Claims, 5 Drawing Sheets

Fig. 5
Fig. 4
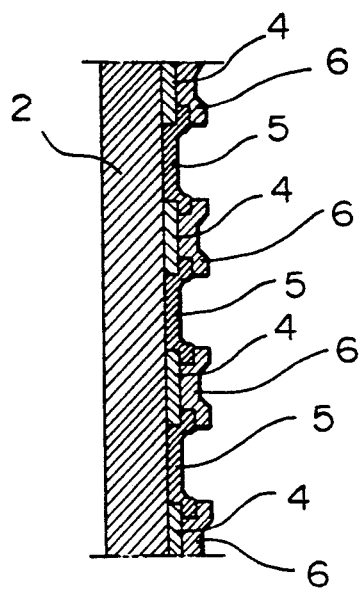
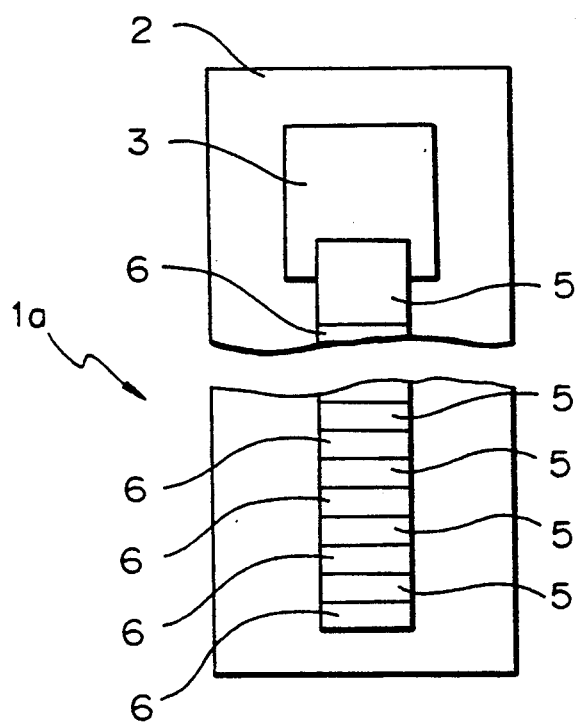
Fig. 6
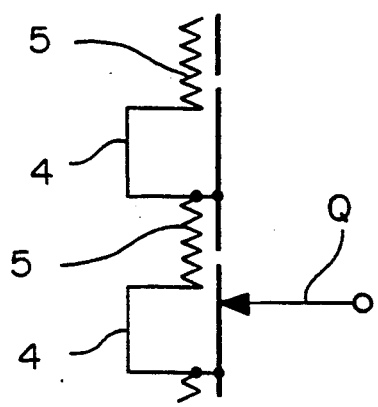

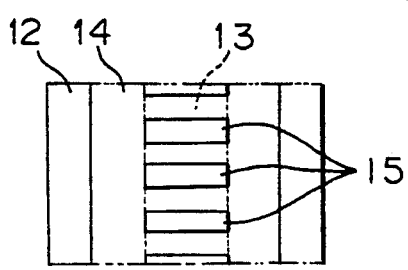
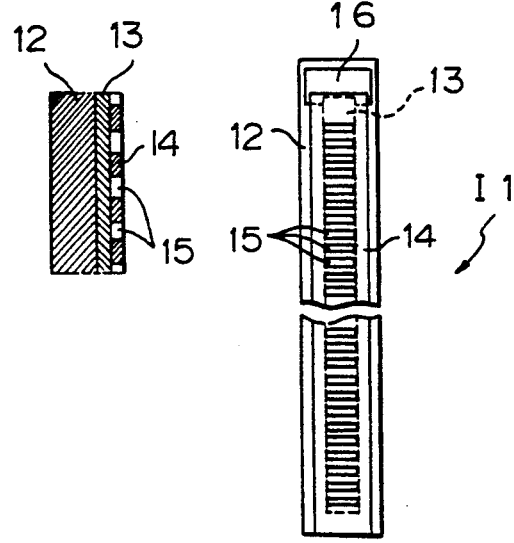
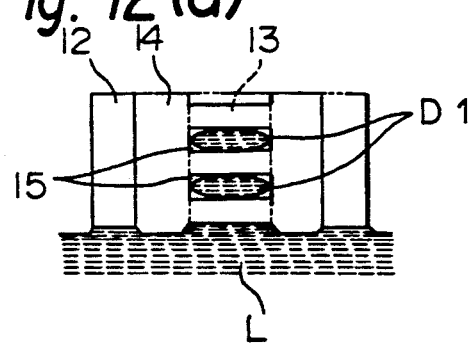
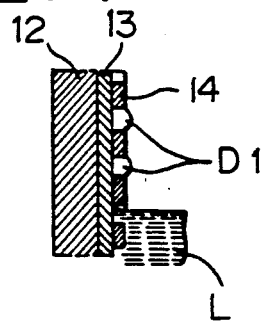

ELECTRODE FOR LEVEL DETECTION

BACKGROUND OF THE INVENTION

1. Field of the Invention

This invention relates to an electrode for level detection used for detecting level of a liquid or a powder.

2. Description of the Prior Art

A conventional electrode for level detection is of a structure comprising a lead electrode formed on the upper surface of an insulating substrate or base plate, and a detection electrode formed in a stripe shape from the lead electrode to the lower end portion of the substrate.

When the electrode of the above structure which is referred to as a first electrode and another electrode of the same structure as the first electrode which is referred to as a second electrode are oppositely disposed in a fluid to be measured (e.g., a battery electrolyte or a conductive toner) to measure impedance between the first and second electrodes, impedance changes in dependency upon the length of the portion of the detection electrode which is not immersed by the fluid to be measured. Thus, the level of the fluid can be detected.

For example, when a resistor is used as the detection electrode, where the fluid to be measured has a conductive or resistive property, level detection can be made by the resistance value between the first and second electrodes.

Further, when a conductor is used as the detection electrode, where the fluid to be measured has a resistive property, level detection can be made by the resistance value between the first and second electrodes, and where the fluid to be measured has a dielectric property, level detection can be made by the electrostatic capacitance value between the first and second electrodes.

In addition, when a dielectric resin coated conductor is used as the detection electrode, even in the case where the fluid to be measured has a conductive property or a dielectric property, level detection can be made by the electrostatic capacitance value between the first and second electrodes.

In the case of an electrode for level detection using a resistor as the detection electrode, there is unevenness in the characteristic resulting from unevenness in the production.

Since the electrode for level detection is relatively frequently exchanged because of corrosion, reproducibility of the characteristic is required. Thus, trimming is carried out to make an adjustment so that unevenness as stated above does not result.

However, since the detection electrode is a continuous elongated member in the conventional electrode for level detection, there is difficulty in trimming. Accordingly, there is a limitation in adjustment, resulting in poor reproducibility or yield.

Further, there are instances generally in the conventional electrode for level detection where the height of the portion of the detection electrode with which the fluid to be measured is in contact and the height of the portion of the detection electrode with which another fluid to be measured is in contact may differ from each other because the surface tensions of the both fluids are different from another one. As the result, errors in measurement do not fall within a fixed range, leading to the problem that valuation of accuracy or assurance of accuracy becomes difficult.

In addition, when the drop of a fluid to be measured adheres to the surface of a detection electrode under the state where that drop is contiguous to the fluid to be measured, there is also the problem that an error corresponding with the volume of the drop might occur.

In view of this, a technique to prevent adhesion of a drop of fluid by application of ultrasonic vibration has been proposed. However, even with this technique, a new problem that the device becomes complicated might occur.

SUMMARY OF THE INVENTION

With the above in view, the first object of this invention is to provide an electrode for level detection improved so that trimming can be easily carried out.

Further, the second object of this invention is to provide an electrode for level detection improved so that no unevenness in an error results even if surface tensions are different from one another.

Furthermore, the third object of this invention is to provide an electrode for level detection improved so that an error resulting from adhesion of a drop can be suppressed by a simple construction.

In the first aspect, this invention provides an electrode for level detection in which a detection electrode includes conductor portions and resistor portions arranged and formed one after the other in the level change direction.

In the second aspect, this invention provides an electrode for level detection which further comprises an insulating coating layer formed on either each conductor portion or each resistor portion.

The widths of the conductor portion and the resistor portion may be selected on the basis of a desired resolution, and may be also selected in consideration of the surface tension. When reference is made to an example of approximate numerical value, it is suitable that this width is set to about 0.1 to 1 mm. It is not necessarily required that the width of the conductor portion and that of the resistor portion be equal to each other.

It is preferable to use, as the insulating coating layer, a material having a property to repel the fluid or liquid to be measured.

In the third aspect, this invention provides an electrode for level detection in which the surface of a detection electrode immersed by a fluid or liquid to be measured is divided into a large number of small sections arranged in a level change direction, one group of every other small sections being such that the detection electrode is exposed, the other group thereof being coated or covered with a film having a property to repel the fluid or liquid to be measured.

In the above described construction, the detection electrode may be comprised of a resistor, a conductor, or a conductor coated with a dielectric material. A detection electrode comprised of a resistor or a conductor coated with a dielectric material is useful for conductive, resistive and dielectric fluids or liquids to be measured. On the other hand, a detection electrode comprised of a conductor is useful for resistive and dielectric fluids or liquids to be measured.

Further, as the coating film having a property to repel a fluid or liquid to be measured, e.g., a water repellent film of silicon resins may be used. Such a film is useful for aqueous liquids to be measured (e.g., a battery electrolyte, etc.). In addition, a film of fluorine resins (e.g., tetrafluoroethylene) may be used. Such a film is useful for hydrophobic liquids to be measured (e.g., an organic solvent, etc.).

The coating film may be formed by sticking of film, painting, spraying, or printing, etc.

It is preferable to select the width of the small section on the basis of the strength of the surface tension determined by combination of a fluid or liquid to be measured and the coating film. When reference is made to an example of approximate numerical value, it is suitable that the width of the small section is about 0.1 to 1 mm.

It is not necessarily required that the width of the small section of the exposed portion and that of the small section of the coated portion be equal to one another.

In addition, it is preferable to form a protective film of an anisotropic conductor on the surface of the exposed portion of the detection electrode in order to prevent corrosion of the surface of the exposed portion thereof.

BRIEF DESCRIPTION OF THE DRAWINGS

FIG. 4 is a front view of an electrode for level detection according to another embodiment of this invention.

FIG. 5 is a partially enlarged cross sectional view of the electrode for level detection shown in FIG. 4.

FIG. 6 is an equivalent circuit diagram of the electrode for level detection shown in FIG. 4.

FIG. 10 is a front view of an electrode for level detection according to a still further embodiment of this invention.

FIGS. 11a and 11b are a partially enlarged front view and a cross sectional view of the electrode for level detection shown in FIG. 10, respectively.

FIGS. 12a and 12b are views corresponding to FIGS. 11a and 11b, showing how a liquid drop is attached to the electrode for liquid level detection shown in FIG. 10, respectively.

DESCRIPTION OF THE PREFERRED EMBODIMENTS

This invention will be described in more detail in accordance with the preferred embodiments illustrated. It is to be noted that this invention is not limited by these embodiments.

Figure 2:
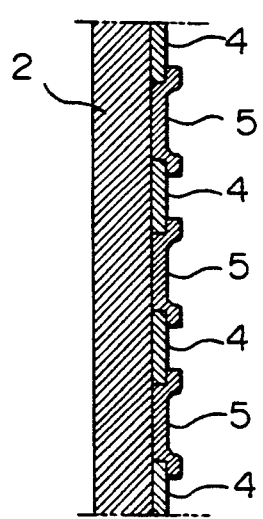
FIG. 2 is a partially enlarged cross sectional view of the electrode for level detection shown in FIG. 1.
Figure 1:
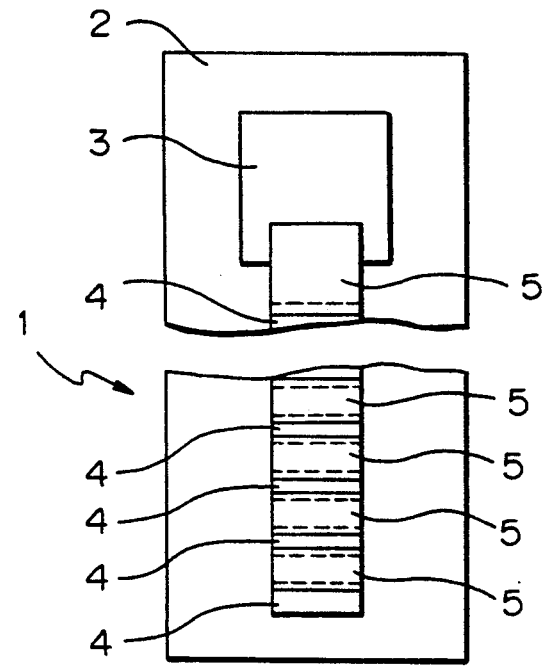
FIG. 1 is a front view of an electrode for level detection according to an embodiment of this invention.

An electrode 1 for level detection according to an embodiment of this invention shown in FIG. 1 and 2 is made by etching a rectangular copper coated fiberglass reinforced epoxy resin substrate or base plate 2 to form a lead electrode 3 and intermediate electrodes 4, 4, ... at predetermined intervals, and thereafter providing resistors 5, 5, ... of phenol resins by screen printing so that the resistors 5, 5, ... fill up the portions between those electrodes 3, 4, 4, ... and the end portions of the resistors 5, 5, ... and the electrodes 3, 4, 4, ... overlap one another. Thus, a detection electrode including intermediate electrodes 4, 4, ... and resistors 5, 5, ... contiguous one after the other to each other is provided.

When reference is made to an example of numerical value, the fiberglass reinforced epoxy resin substrate 2 has a thickness of 1.6 mm, a width of 10 mm, and a length of 100 mm. The lead electrode has a width of 5 mm and a length of 5 mm. The intermediate electrodes 4 have a width of 3 mm, a length of 1 mm, and a pitch of 2 mm. In addition, the resistors 5 have a width of 3 mm and a length of 1.5 mm.

Figure 3:
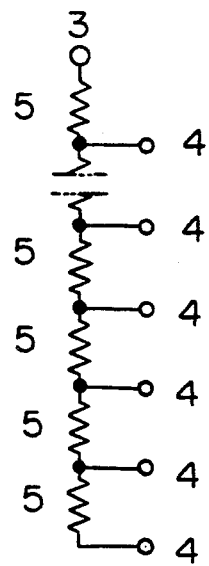
FIG. 3 is an equivalent circuit diagram of the electrode for level detection shown in FIG. 1.

This electrode 1 for level detection constitutes an equivalent circuit as shown in FIG. 3. As understood from this equivalent circuit, it is sufficient to independently trim every resistor 5 put between two intermediate electrodes 4, 4. Thus, trimming is extremely facilitated. Further, the rate of failure is lowered, resulting in an improved yield.

Referring to FIGS. 4 and 5, there is shown an electrode 1a for level detection which further includes, in addition to the above configuration, an insulating coating layer 6 formed by printing a water repellent paste of silicon resins on the upper layers of the intermediate electrodes 4, 4, ...

In this case, even if an aqueous liquid to be measured (e.g., a battery electrolyte) has a level equal to the portion of the insulating coating layer 6, the liquid to be measured is electrically in contact with the portion of the resistor 5 below the insulating coating layer 6. When the level rises to reach the portion of the resistor 5 on the upper side, the liquid to be measured comes in contact with the entire surface of the resistor 5 on the upper side at a stroke or immediately by surface tension. Its equivalent circuit is expressed as shown in FIG. 6, where Q represents the level of a liquid to be measured. Accordingly, even if there is, to some extent, a difference between surface tensions, no influence is exerted on measured results. As a result, unevenness in an error due to the surface tension dose not result. Thus, valuation of precision or assurance of precision becomes easy.

As an alternative form, although not shown, an insulating coating layer 6 may be formed on the upper layers of the resistors 5, 5, ... in a manner opposite to the above.

Figure 7:
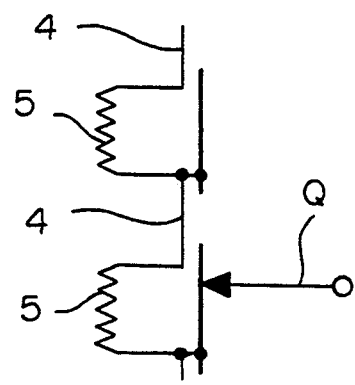
FIG. 7 is an equivalent circuit diagram of an electrode for level detection according to a further embodiment of this invention.

The equivalent circuit in that case is as shown in FIG. 7. Since the portion of the intermediate electrode 4 comes into contact with a fluid or liquid to be measured, even if contact heights differ to some extent by the difference between surface tensions, no influence is exerted on the resistance value. Accordingly, unevenness in an error due to the surface tension does not result. Thus, valuation of accuracy or assurance of accuracy becomes easy.

Figure 8:
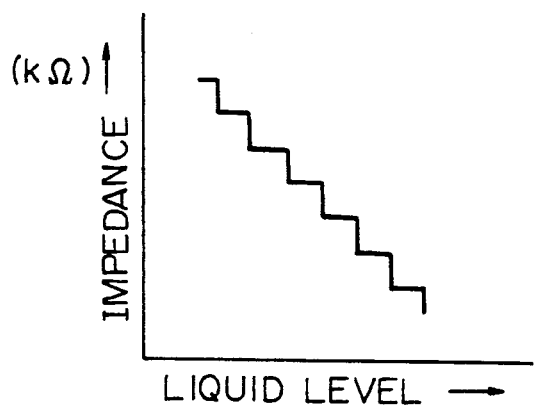
FIG. 8 is a graphical representation of the relation between a liquid level and impedance corresponding to the equivalent circuits shown in FIGS. 6 and 7.

The relationship between the liquid level Q and resistance values measured is in the form of a stair-step as shown in FIG. 8. In this instance, measurement was conducted using an A.C. of 1 kHz. Since such a relationship is in the form of a stair-step as stated above, resolution becomes constant, resulting in an easy transformation to a digital representation.

Figure 9A:
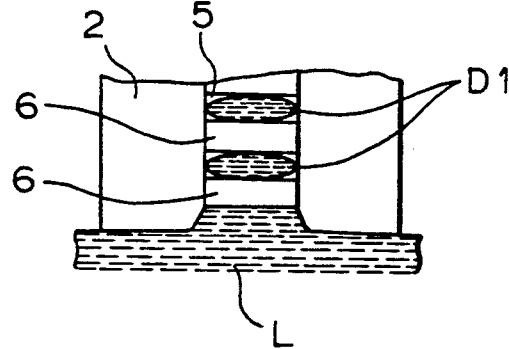
FIGS. 9a and 9b are a partially enlarged front view and a cross sectional view showing how a drop is attached to the electrode for level detection shown in FIG. 4, respectively.
Figure 9B:
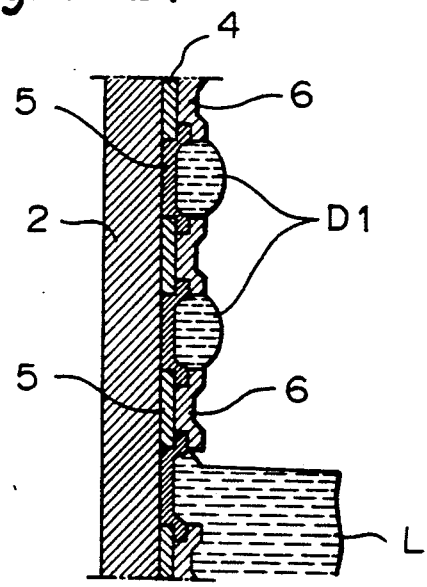

Further, where the insulating coated layer 6 is comprised of a material having a property to repel a liquid L to be measured as shown in FIG. 9, even if a liquid drop D1 of the liquid L to be measured is attached thereto, it is separated from the liquid L to be measured and therefore does not communicate therewith. Accordingly, no influence is exerted on measurement, resulting in no error in measurement.

Referring to FIG. 10 and 11, there is shown an electrode 11 for liquid level detection according to a further embodiment of this invention. This electrode 11 is made up by forming a lead electrode 16 on one side of a rectangular fiberglass reinforced epoxy resin substrate 12, printing resistors of phenol resins in a stripe shape to form a detection electrode 13, and printing a coating film 14 comprised of a water repellent resin of silicon on the surface of the detection electrode 13 so that the coating film 14 forms a predetermined pattern. The predetermined pattern referred to here is a pattern in which a large number of rectangular small openings 15 of a predetermined size are arranged in alignment at predetermined pitches.

When reference is made to an example of numerical value, the fiberglass reinforced epoxy resin substrate 12 has a thickness of 1.6 mm, a width of 5 mm, and a length of 100 mm. The lead electrode 16 has a width of 3 mm and a length of 5 mm. The detection electrode 13 has a width of 2 mm and a length of 90 mm. The coating layer 14 has a width of 3 mm and a length of 95 mm, and the upper portion of 2 mm thereof overlaps with the lead electrode 16. In addition, the small openings 15 have a width of 2 mm and a length of 0.5 mm, and are arranged at a pitch of 1 mm.

In accordance with the electrode 11 for liquid level detection, even if liquid drops D1 of the liquid L to be measured are attached to small openings 15, 15 as shown in FIG. 12, they are separated from the liquid L to be measured by the coating film 14. Accordingly, no influence is exerted on measurement, resulting in no error in measurement.

Figure 13:
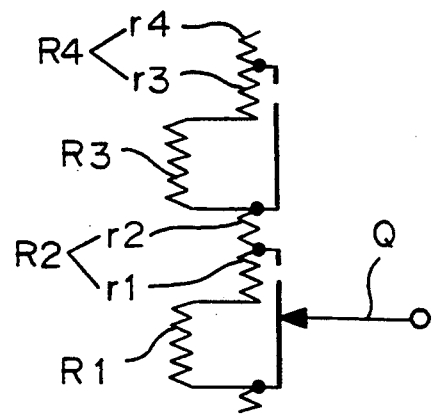
FIG. 13 is a partial equivalent circuit diagram of the electrode for liquid level detection shown in FIG. 10.

The equivalent circuit of the electrode 11 for liquid level detection is shown in FIG. 13, where Q represents the level of a liquid L to be measured, which changes upwardly and downwardly. R1 and R3 represent resistors at the portions coated with the coating film 14, and R2 and R4 represent resistors exposed at the portions of the small openings 15, respectively. In addition, r1 and r3 represent portions of the resistors which come into contact with the liquid L to be measured at a stroke by the surface tension, and r2 and r4 represent portions of the resistors in which the contact area changes in dependency upon changes in the liquid level Q.

When the liquid level Q is located at the position corresponding to the coating film 14 as shown in FIG. 13, the liquid L to be measured and the detection electrode 13 come into contact with one another at the portions of the small openings 15 below the position corresponding to the coating film 14. As a result, the resistance of the portion above the resistor R1 appears as a measured value. When the liquid level Q rises to reach the next small opening 15, the detection electrode 13 comes into contact with the liquid L to be measured to some degree at a stroke by the surface tension. As a result, the resistance of the portion above the resistor r2 appears as the measured value. When the liquid level Q further rises, the area of the detection electrode 13 which comes into contact with the liquid L to be measured changes in dependency upon the level change. As a result, the resistance value proportionally changes. When the liquid level Q rises up to the position corresponding to the next coating film 14, the detection electrode 13 comes into contact with the liquid L to be measured at the portion of the small opening 15 below the position corresponding to the next coating film 14. As a result, the resistance of the portion above the resistor R3 appears as a measured value. Resistance values will change in a manner similar to the above.

Figure 14:
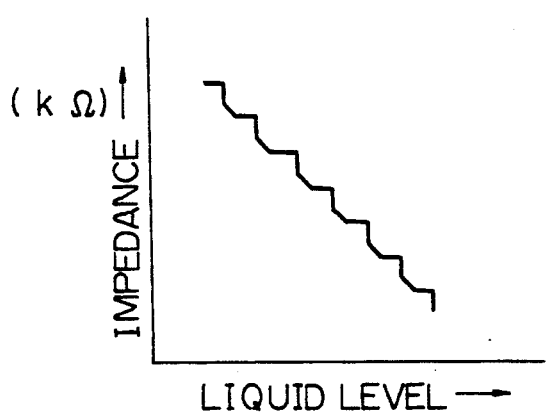
FIG. 14 is a graphical representation of the relation between a liquid level and impedance corresponding to the equivalent circuit shown in FIG. 13.

The relationship between the liquid level Q and the resistance value measured is expressed in the form of substantially stair-step as shown in FIG. 14. Measurement in this case was conducted using an A.C. of 1 kHz.

Figure 15:
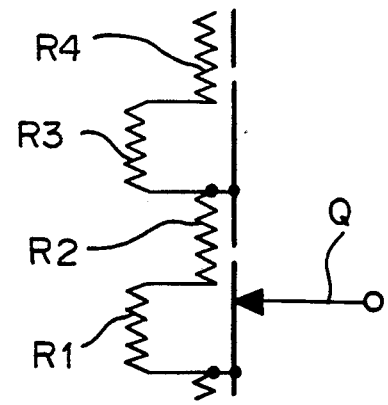
FIG. 15 is a partial equivalent circuit diagram of the electrode for liquid level detection shown in FIG. 10.
Figure 16:
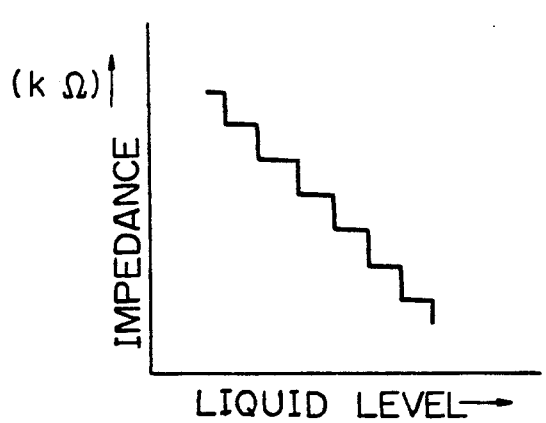
FIG. 16 is a graphical representation of the relation between a liquid level and impedance corresponding to the equivalent circuit shown in FIG. 15.

If the size in upward and downward directions of the small opening 15 is suitably selected in dependency upon the surface tension, the portion of which resistance value proportionally changes is eliminated, resulting in the equivalent circuit shown in FIG. 15. As shown in FIG. 16, the relationship between the liquid level Q and resistance values measured is in the form of complete stair-step.

When the relationship therebetween is expressed in the form of stair-step, the output precision valuation becomes easy and the assurance of precision also becomes easy.

It is to be noted that when this invention is applied to a system for measuring electrostatic capacitance, the same advantages as above can be provided.

What is claimed is:

1. An electrode for the level detection of a fluid having a level that changes in a given direction, in which a detection electrode comprises a group of conductor portions and a group of resistor portions with said conductor portions and resistor portions being arranged one after the other in said direction, and means inhibiting contact between said fluid and the portions of one of said groups while permitting contact between said fluid and the portions of the other of said groups.

2. An electrode for level detection as set forth in claim 1, wherein said means inhibiting contact between said fluid and the portions of one of said groups comprises an insulating coating layer formed on either each conductor portion or each resistor portion.

3. An electrode for level detection as set forth in claim 2, wherein said insulating coating layer is comprised of a film having a property to repel a fluid to be measured.

4. An electrode for level detection of a fluid having a level that changes in a given direction, in which the surface of a detection electrode is immersed in a fluid to be measured, said detection electrode being comprised of a group of a plurality of first small sections and a group of a plurality of second small sections, first and second said sections being arranged alternately in said direction, the sections of one group of sections being exposed to said fluid, the sections of the other group thereof being coated with a film having a property to repel said fluid to be measured.

5. The electrode of claim 4 wherein said first sections are resistive and said second sections are conductive.

6. An electrode for the level detection of a fluid having a level that changes in a given direction, said electrode comprising an insulating substrate, a group of a plurality of conductive sections on said substrate and spaced apart in said direction, a group of a plurality of resistive sections, with each resistive section being on said substrate between a separate pair of adjacent conductive sections, and insulating means covering the sections of only one of said groups of sections.

* * * * *